(12) United States Patent
Bloom et al.

(10) Patent No.: US 9,389,069 B2
(45) Date of Patent: Jul. 12, 2016

(54) COMPACT 3D DEPTH CAPTURE SYSTEMS

(71) Applicants: David M Bloom, Jackson, WY (US); Matthew A Leone, Jackson, WY (US)

(72) Inventors: David M Bloom, Jackson, WY (US); Matthew A Leone, Jackson, WY (US)

(73) Assignee: Alces Technology, Inc., Jackson, WY (US)

( * ) Notice: Subject to any disclaimer, the term of this patent is extended or adjusted under 35 U.S.C. 154(b) by 240 days.

(21) Appl. No.: 14/226,515

(22) Filed: Mar. 26, 2014

(65) Prior Publication Data
US 2015/0281671 A1    Oct. 1, 2015

(51) Int. Cl.
*G01B 11/25*    (2006.01)

(52) U.S. Cl.
CPC .......... *G01B 11/254* (2013.01); *G01B 11/2527* (2013.01)

(58) Field of Classification Search
None
See application file for complete search history.

(56) References Cited

U.S. PATENT DOCUMENTS

| | | | |
|---|---|---|---|
| 6,388,754 B1 | 5/2002 | Nishikawa et al. | |
| 7,844,079 B2 | 11/2010 | Hassebrook et al. | |
| 2003/0021599 A1 | 1/2003 | Brazas et al. | |
| 2005/0046872 A1 | 3/2005 | Hu | |
| 2005/0162615 A1 | 7/2005 | Penn | |
| 2005/0237743 A1 | 10/2005 | Payne | |
| 2006/0114544 A1 | 6/2006 | Bloom | |
| 2008/0112677 A1 | 5/2008 | Smith | |
| 2008/0205748 A1 | 8/2008 | Lee et al. | |
| 2008/0273211 A1* | 11/2008 | Schmitt | G01B 11/245 356/611 |
| 2010/0182311 A1 | 7/2010 | Kim | |
| 2011/0169915 A1* | 7/2011 | Bloom | H04N 13/0253 348/46 |
| 2011/0292347 A1* | 12/2011 | Zhang | G03B 17/54 353/28 |
| 2012/0099171 A1* | 4/2012 | Yeh | G09G 3/3433 359/231 |
| 2013/0027671 A1* | 1/2013 | Miyazaki | F16F 15/324 353/31 |
| 2014/0002887 A1* | 1/2014 | Yeung | G02B 26/00 359/291 |
| 2014/0280316 A1* | 9/2014 | Ganick | G06F 17/30522 707/769 |
| 2015/0015482 A1* | 1/2015 | Njolstad | G06F 3/0386 345/156 |

FOREIGN PATENT DOCUMENTS

| | | |
|---|---|---|
| EP | 1876568 A2 | 1/2008 |
| KR | 20100084718 | 7/2010 |

OTHER PUBLICATIONS

International Search Report and Written Opinion of the International Searching Authority in PCT/US2015/021883, Jul. 14, 2015.
Search report and written opinion of the international searching authority in PCT/US2011/021198 Sep. 28, 2011.
(Continued)

*Primary Examiner* — Eileen Adams
(74) *Attorney, Agent, or Firm* — NUPAT, LLC; Morrison Ulman

(57) ABSTRACT

Compact 3D depth capture systems are based on a 3D system driver/interface, a 3D system camera, and a 3D system projector. The systems are compatible with integration in to mobile electronic devices such as smart phones and tablet computers.

26 Claims, 15 Drawing Sheets

(56) References Cited

OTHER PUBLICATIONS

Gorthi et al., "Fringe Projection Techniques: Whither we are?", Optics and Lasers in Engineering preprint, Sep. 2009.
Blais, "Review of 20 Years of Range Sensor Development", National Research Council Canada, Jan. 2004.
Indebetouw, "Profile measurement using projection of running fringes", Applied Optics, v 17, p. 2930, Sep. 1978.
Kimachi et al., "Real-Time Phase-Stamp Range Finder Using Correlation Image Sensor", IEEE Sensors J., v. 9, p. 1784, Dec. 2009.
Zhang et al., "Generic nonsinusoidal phase error correction for three-dimensional shape measurement using a digital video projector", Applied Optics, v. 46, p. 36, Jan. 2007.
Zhang et al., "High-resolution, real-time 3D absolute coordinate measurement based on a phase-shifting method", Optics Express, v. 14, p. 2644, Apr. 2006.
Ando et al., "Spatio-temporal phase-encoding profilometry using correlation image sensor", IEEE International Symposium on Industrial Electronics, p. 786, 2008.
Pethe, "Super resolution 3D scanning using spatial light modulator and band correction", University of Kentucky Masters Thesis, 2008.
Garcia et al., "Temporally-Consistent Phase Unwrapping for a Stereo-Assisted Structured Light System", IEEE 2011 Intl. Conf. 3D Imaging, Modeling, Processing, Visualization and Transmission, 2011.
Garcia et al., "Consistent Stereo-Assisted Absolute Phase Unwrapping Methods for Structured Light Systems", IEEE J. Selected Topics in Signal Processing, v. 6, p. 411, 2012.
Weise et al., "Fast 3D Scanning with Automatic Motion Compensation", IEEE, 2007.

\* cited by examiner $I_\square = \boxed{0} - \boxed{2}$ $Q_\square = \boxed{1} - \boxed{3}$ $\phi_\square = \tan^{-1}(I_\square / Q_\square)$ $I_\triangle = \triangle_0 - \triangle_2$ $Q_\triangle = \triangle_1 - \triangle_3$ $\phi_\triangle = \tan^{-1}(I_\triangle / Q_\triangle)$

COMPACT 3D DEPTH CAPTURE SYSTEMS

TECHNICAL FIELD

The disclosure is related to 3D depth capture systems, especially those suited for integration into mobile electronic devices.

BACKGROUND

Three-dimensional (3D) depth capture systems extend conventional photography to a third dimension. While 2D images obtained from a conventional camera indicate color and brightness at each (x, y) pixel, 3D point clouds obtained from a 3D depth sensor indicate distance (z) to an object surface at each (x, y) pixel. Thus, a 3D sensor provides measurements of the third spatial dimension, z.

3D systems obtain depth information directly rather than relying on perspective, relative size, occlusion, texture, parallax and other cues to sense depth. Direct (x, y, z) data is particularly useful for computer interpretation of image data. Measured 3D coordinates of an object may be sent to a 3D printer to create a copy of the object, for example. Measured 3D coordinates of a human face may improve the accuracy of computer facial recognition algorithms and reduce errors due to changes in lighting.

Many techniques exist for 3D depth capture, but two of the most successful so far are time of flight and structured light approaches. Time of flight is based on measuring the round trip time for light to travel from a 3D depth capture system to an object and back. The farther away the object is, the longer the round trip time. Structured light is based on projecting a light pattern onto an object and observing the pattern from a vantage point separated from the projector. For example a pattern of parallel stripes projected onto a face appears distorted when viewed from a position away from the projector.

Current 3D depth capture systems are not small enough to be integrated into mobile electronic devices such as cell phones and tablet computers. Some systems have been packaged into centimeter scale enclosures that can be strapped onto tablets. For 3D depth capture to become a viable addition to mobile devices' sensor suites, however, miniaturization to the millimeter scale is needed.

DETAILED DESCRIPTION

Compact 3D depth capture systems described below are designed to be integrated into smart phones and other mobile devices. Miniaturization needed for mobile applications is based on new structured light subsystems including optical pattern projection and detection techniques, and system integration concepts. Compact 3D depth capture systems are based on linear-array MEMS-ribbon optical pattern projectors. The systems estimate depth at each pixel independently, with relatively simple computations.

Figure 1A:
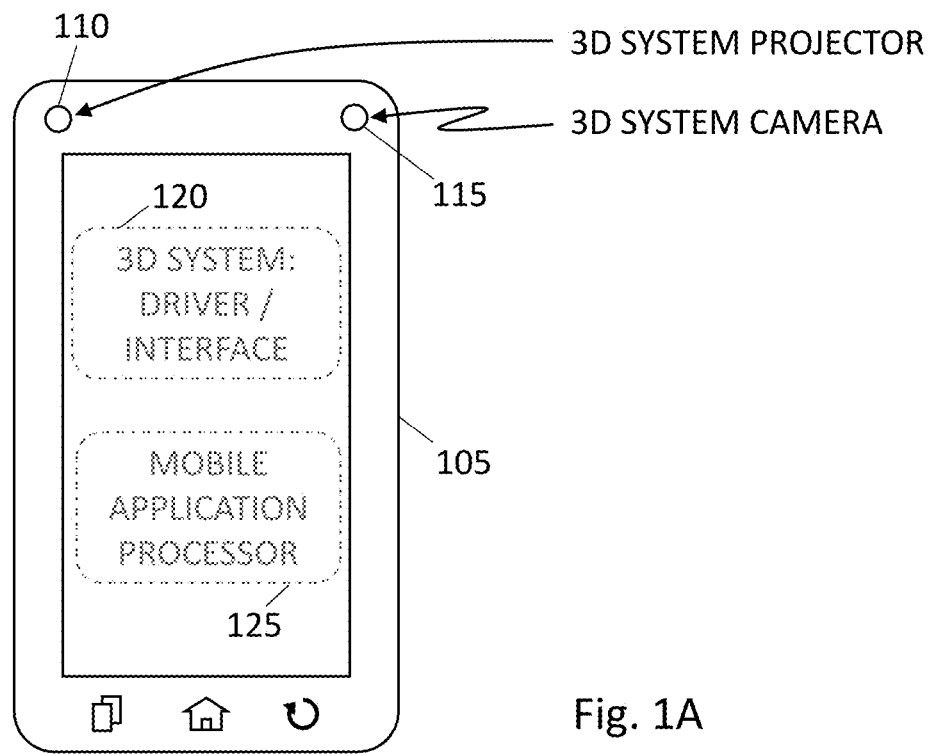
FIG. 1A shows a mobile electronic device equipped with an integrated 3D depth capture system.

FIG. 1A shows a mobile electronic device 105 equipped with an integrated 3D depth capture system. The system includes 3D system projector 110, 3D system camera 115, and 3D system driver/interface 120. The driver/interface provides 3D capabilities to the mobile device's application processor 125. While the projector is a dedicated component of the 3D system, the camera may be used for conventional photo and video as well.

Figure 1B:
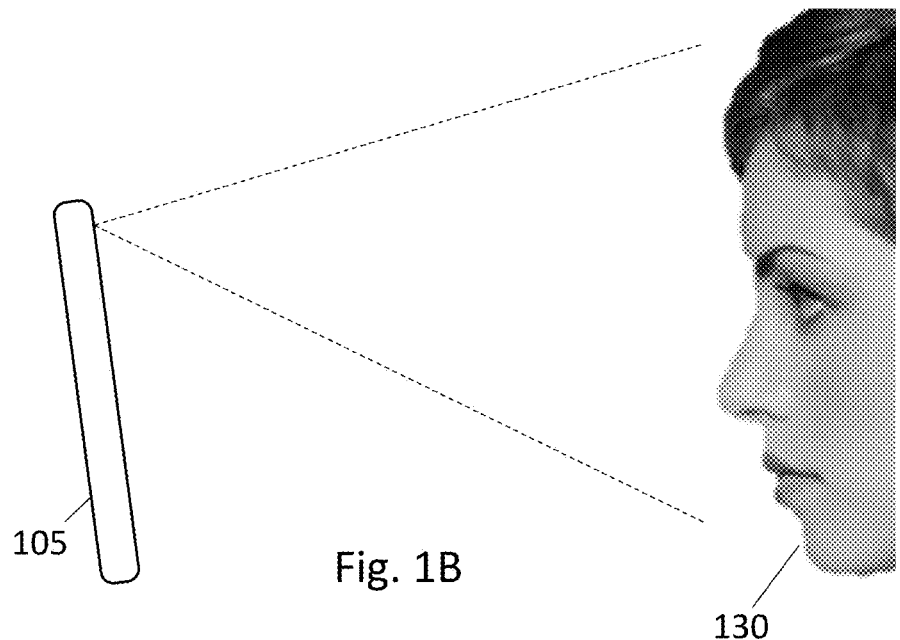
FIG. 1B shows the device of FIG. 1A in a face recognition scenario.

FIG. 1B shows the device of FIG. 1A in a face recognition scenario. When a user aims the device at his or her face 130 the depth capture system obtains set of 3D (x, y, z) points representing the distance from the device to surface contours of the face. This data may be used as an aid in a facial recognition algorithm for biometric identification, for example.

A smart phone, tablet or similar mobile device may be equipped with 3D system projectors and cameras on its front, back or even side surfaces. These sensors may be optimized for different purposes. A front-facing 3D system may be used to help a phone recognize its owner at arm-length distances while a rear-facing 3D system may provide data for indoor navigation or situational awareness applications, as examples.

Figure 2:
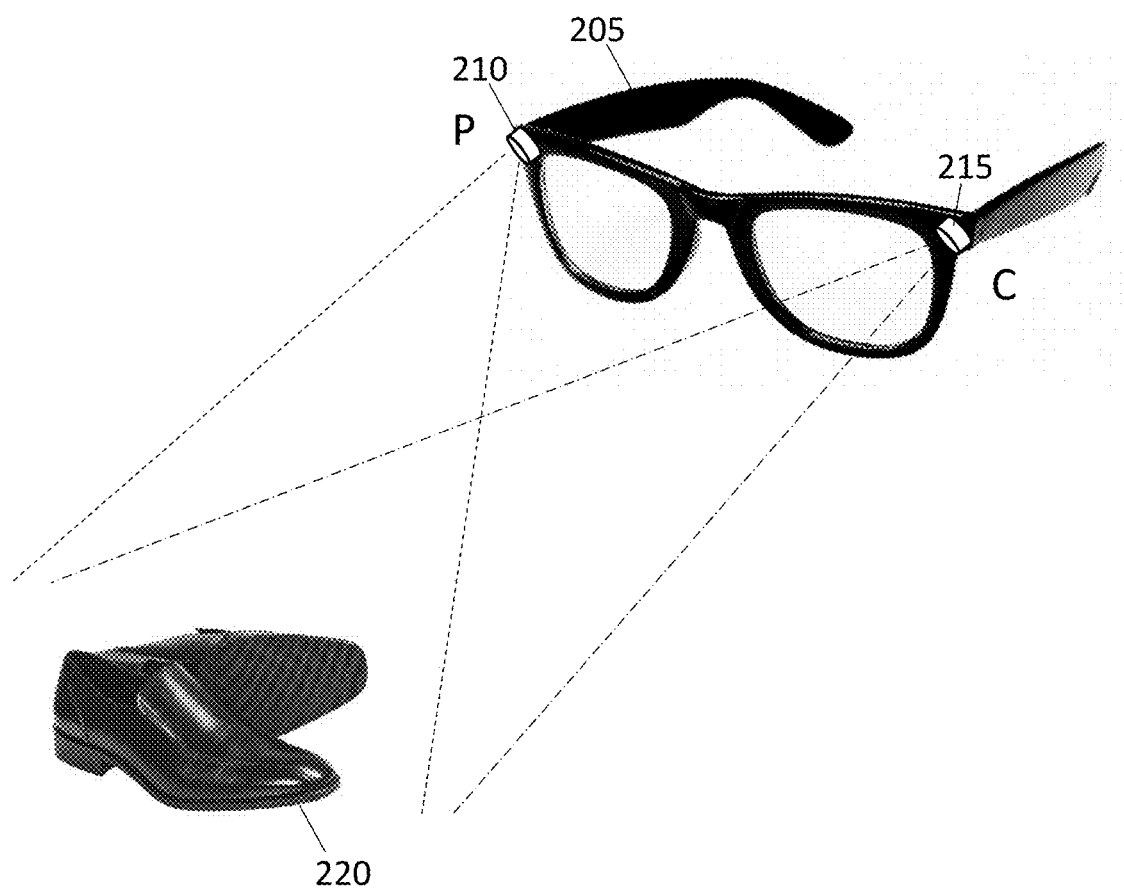
FIG. 2 shows a compact 3D depth capture system integrated into a pair of eyeglasses.

Compact 3D depth capture system projectors and cameras are small enough to be embedded in other kinds of personal accessories. FIG. 2 shows a compact 3D depth capture system integrated into a pair of eyeglasses 205. In the example of FIG. 2, 3D system projector 210 and 3D system camera 215 are placed in opposite corners of horn-rimmed glasses. These components may communicate with processors in the temples of the glasses to perform object measurements and recognition activities such as identifying the brand or size of pair of shoes 220.

Figure 3:
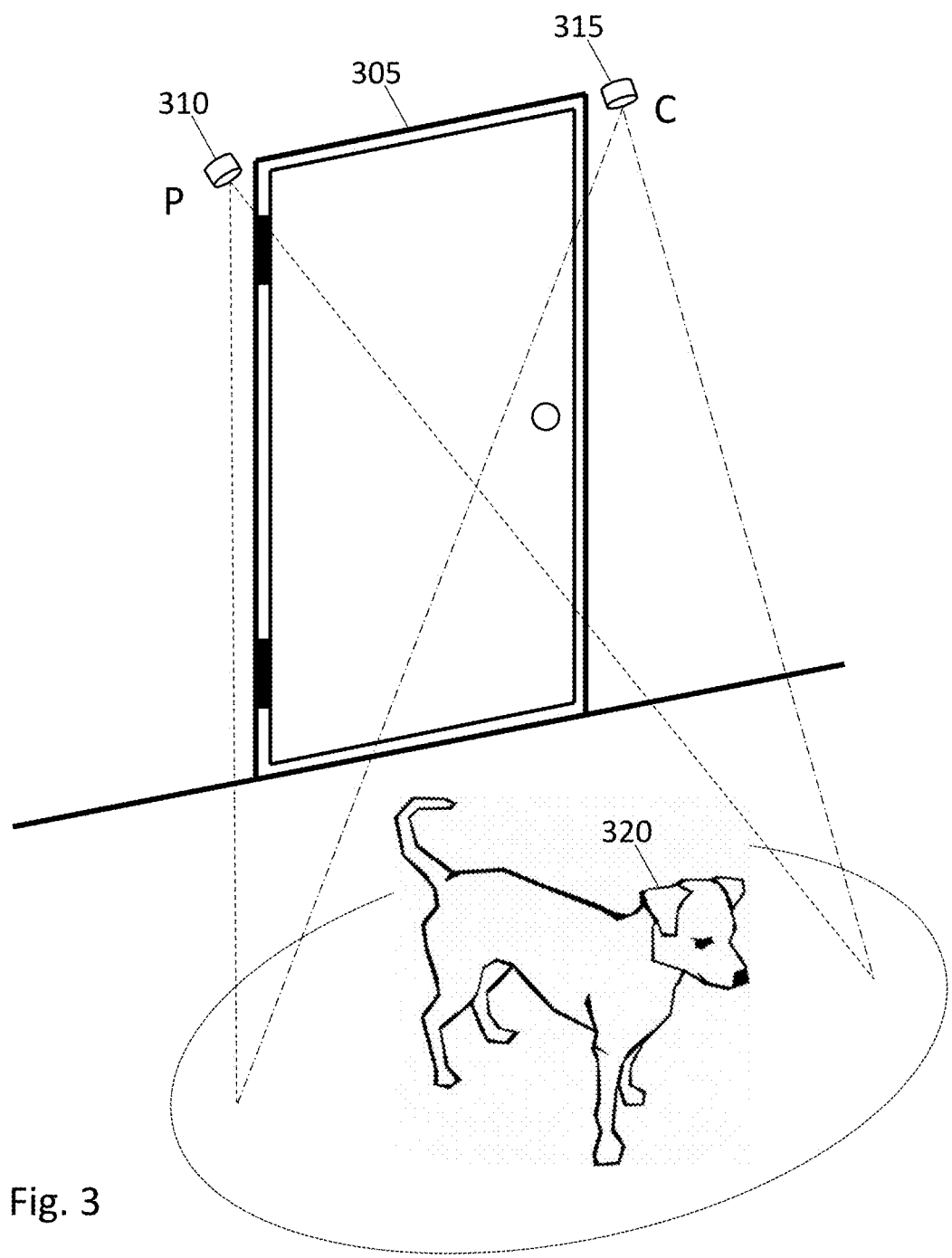
FIG. 3 shows a compact 3D depth capture system integrated into a door frame.

3D depth capture systems that are small enough and inexpensive enough to integrate into mobile electronic devices are also suitable in many other situations. FIG. 3, for example, shows a compact 3D depth capture system integrated into a door frame 305. Here 3D system projector 310 and 3D system camera 315 are located at the top corners of the door frame, but many other mounting options are suitable. A door frame equipped with 3D depth capture technology can identify people, animals (such as dog 320), or other objects nearby and provide access as appropriate. Similarly, 3D depth capture systems may be integrated into automobile dashboards to monitor vehicle occupants. An automatic system may apply brakes if it detects a driver nodding off to sleep, as an example.

Figure 4:
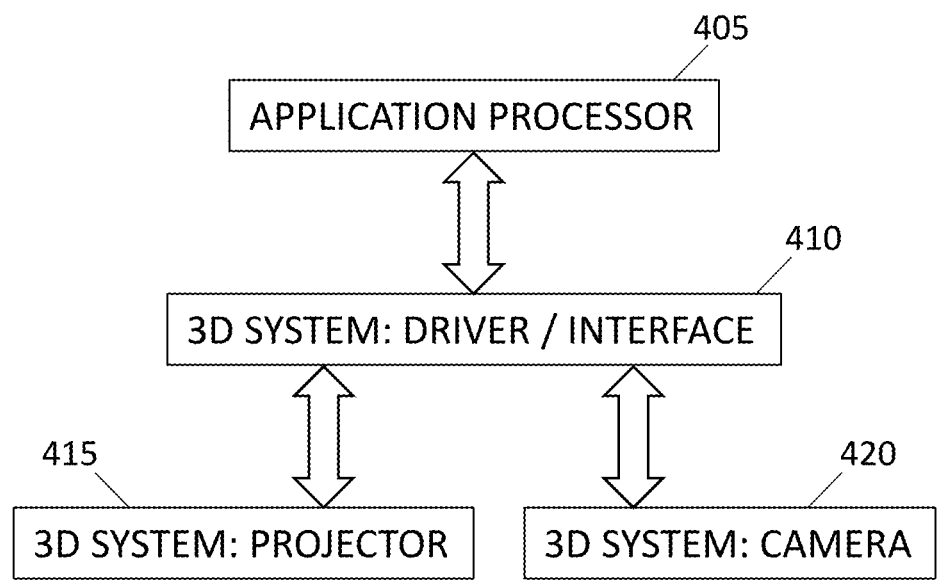
FIG. 4 is a high-level block diagram for a compact 3D depth capture system integrated into a mobile electronic device.

3D depth capture systems, whether used in mobile device, personal accessory, fixed installation, automotive, or other applications, share a common system architecture illustrated in FIG. 4 which is a high-level block diagram for such systems. In FIG. 4, application processor 405 communicates with 3D system driver/interface 410. The driver interface communicates with 3D system projector 415 and 3D system camera 420. Application processor 405 may be any processor or graphics processing unit. Examples include a main application processor in a smart phone or a processing unit in an automobile. Description and examples of the driver/interface, projector and camera are found below.

Figure 5:
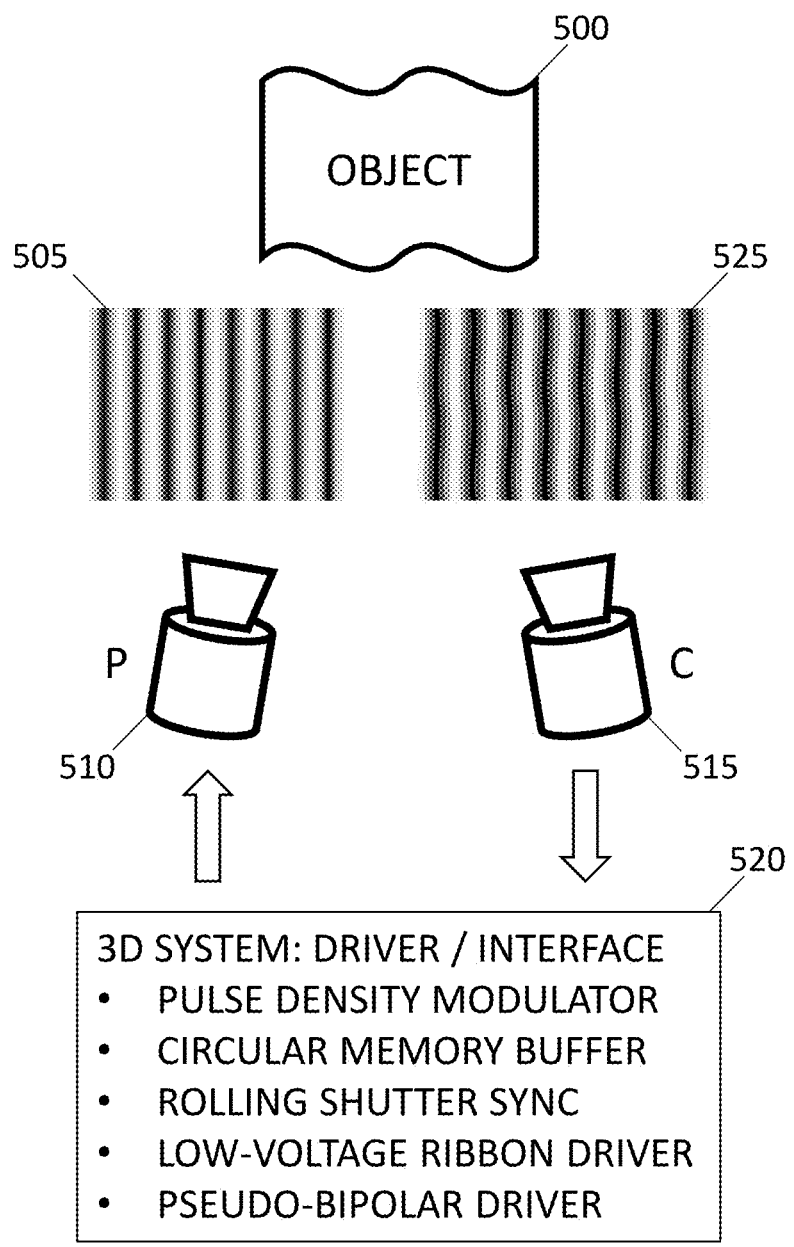
FIG. 5 is a conceptual block diagram of compact 3D depth capture system components.

FIG. 5 is a conceptual block diagram of compact 3D depth capture system operation and components. In FIG. 5, 3D system projector 510 and 3D system camera 515 work with driver/interface 520 to obtain 3D data representing object 500. Projector 510 projects a two-dimensional pattern 505 having spatial variation in one dimension onto the object. Camera 515 observes the pattern from a vantage point separated from the projector by a baseline distance. (The baseline is perpendicular to the direction of spatial variation in the pattern.) The pattern 525 recorded by the camera appears distorted by the surface features of the object.

Each point on the object appears to the camera to be illuminated with light having a sinusoidal intensity variation with time. The camera shares a common time reference with the projector and each operates in a continuous, cyclic mode. The camera frequency (camera cycles per second) is an integer greater than two (i.e. 3, 4, 5 . . . ) multiple of the projector temporal frequency. At each pixel, the camera samples the projector temporal intensity modulation 3, 4, or 5, etc. times during each projector cycle. These measurements allow the camera to determine the temporal phase of the intensity modulation at each pixel. The phase measurements are then used to estimate depth using structured light triangulation techniques.

Details of driver/interface 520 discussed in more detail below include: a pulse density modulator that drives MEMS ribbons in a linear-array spatial light modulator in the 3D system projector; memory addressing techniques that enable quick reconfiguration of the spatial period of projected patterns; synchronous detection of patterns with a rolling shutter camera; low-voltage drive schemes for MEMS ribbons; and pseudo-bipolar operation of MEMS ribbons.

Figure 6:
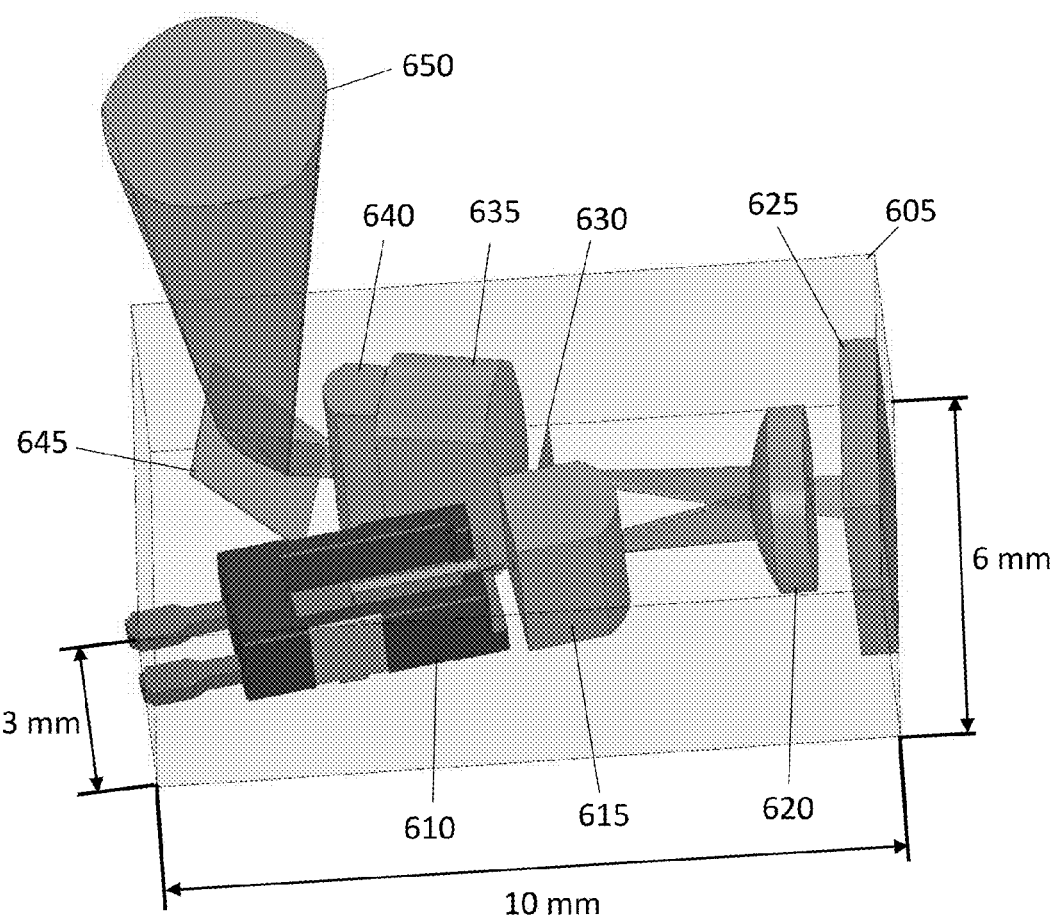
FIG. 6 illustrates a 3D depth capture projector contained in a small volume package suitable for integration into mobile electronic devices.

Projector driver/interface and projector optical components including a laser light source are illustrated in FIG. 6. In an embodiment, these components are packaged in a volume 605 that measures 3 mm×6 mm×10 mm, small enough to be integrated into a smart phone, tablet or other device. Components within this volume include a laser light source, a linear-array MEMS-ribbon optical phase modulator, a Fourier plane optical phase discriminator, and several lenses. Specifically, in FIG. 6, laser 610 is a diode laser that emits light in the infrared. Light from the laser is focused (via x-axis relay cylinder lens 615 and field lens 620) on a linear-array MEMS-ribbon optical phase modulator that is packaged with driver electronics 625. In an embodiment, the MEMS ribbon array measures approximately 0.5 mm×0.2 mm×0.1 mm and each ribbon measures approximately 200 μm×4 μm×0.1 μm; they are not visible in FIG. 6. Light reflected by the phase modulator is incident upon an apodizing filter 630 that acts as an optical phase discriminator. The discriminator converts phase modulation imparted by the MEMS-ribbon linear-array into amplitude modulation. Projection lenses (y-axis projection cylinder 635 and x-axis projection cylinder 640) and fixed mirror 645 then project the light toward an object to be measured.

Figure 7:
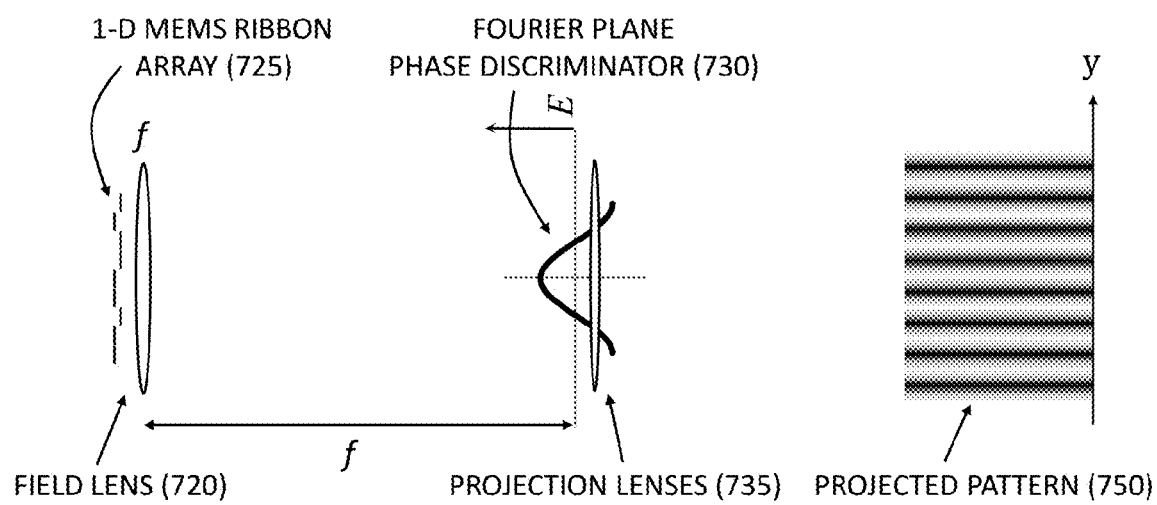
FIG. 7 illustrates optical principles for a 3D depth capture system projector.

FIG. 7 illustrates optical principles for a 3D depth capture system projector such as the system of FIG. 6. In FIG. 7, field lens 720 is placed near a 1-D (i.e. "linear") MEMS ribbon array 725. The focal length of the field lens is f. A Fourier plane phase discriminator 730 is placed f away from the field lens on the opposite side of the lens from the MEMS ribbon array. Projection lenses 735 project pattern 750. Pattern 750 is a two-dimensional pattern having spatial variations in one dimension.

Fourier plane phase discriminators are discussed, for example, in U.S. Pat. No. 7,940,448 issued May 10, 2011 to Bloom, et al., the disclosure of which is incorporated by reference. In particular the phase discriminator used here is similar to the cosine (phase similarity) apodizing filter of FIGS. 10B, 16A and 18 of the '448 patent. In an embodiment, a Schlieren slit approximates the central portion of a cosinusoidal transmission function. The period of the apodizing filter (or width of the Schlieren slit) is chosen to be commensurate with the spacing of ribbons in the MEMS linear array.

The optical system described so far projects a pattern having spatial sinusoidal intensity variation in one dimension. The pattern also appears to have temporal sinusoidal intensity variation. Temporal modulation of the pattern is produced using digital techniques, however. Digital temporal modulation appears as smoothly varying sinusoidal modulation when viewed with a camera having an integration time substantially longer than digital modulation period. These principles may be understood with reference to FIG. 8 which is a conceptual block diagram of electronic and optical signals in a compact 3D depth capture system.

Figure 8:
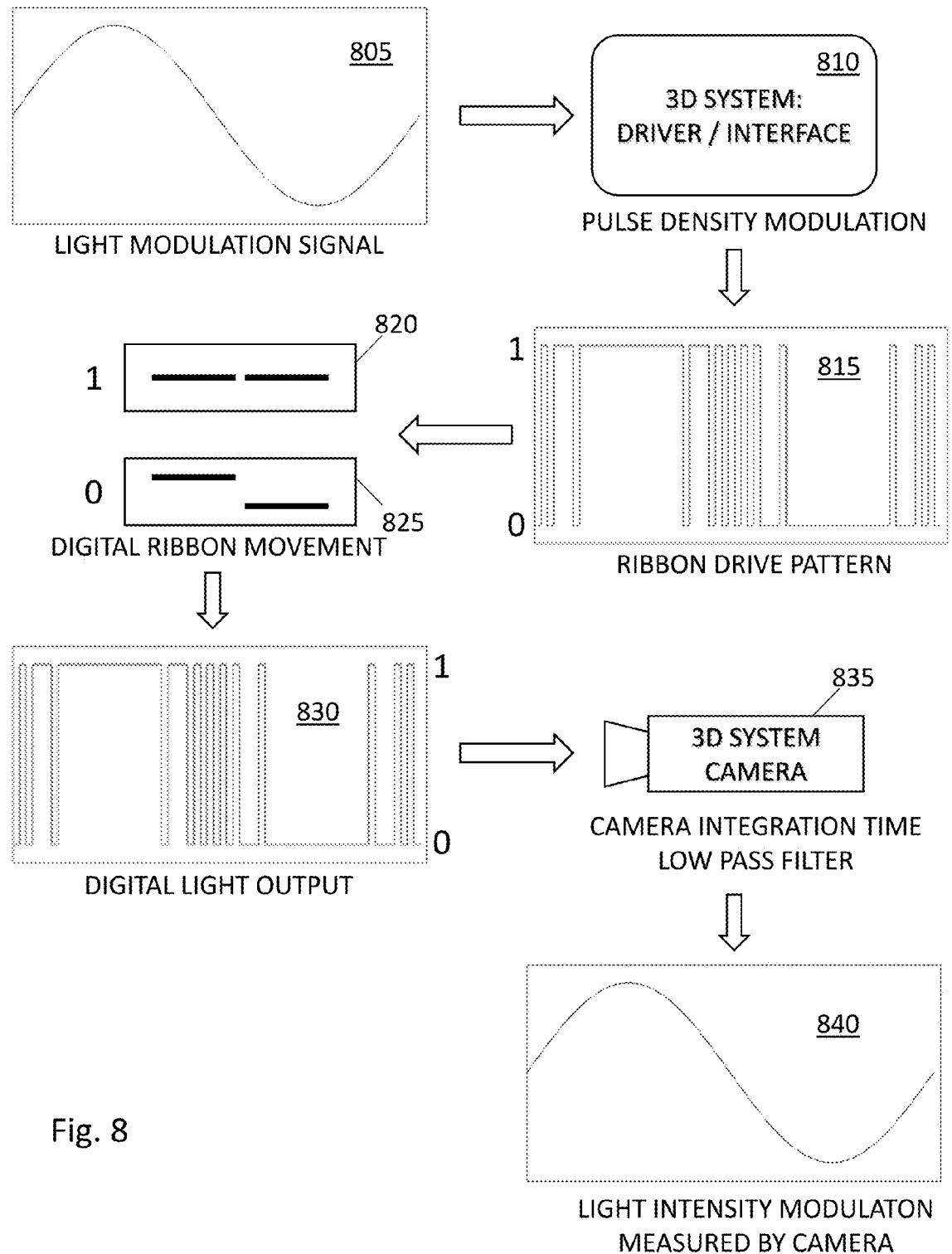
FIG. 8 is a conceptual block diagram of electronic and optical signals in a compact 3D depth capture system.

FIG. 8 illustrates how the appearance of sinusoidal, temporal light modulation is produced. Graph 805 represents the desired, sinusoidal variation of light intensity as a function of time. This function is stored or generated in 3D system driver/interface 810 as a pulse density modulation, digital waveform 815. Ribbon drive pattern waveform 815 alternates between two values, 1 and 0, as time passes. The waveform shown at 815 is a 64 times oversampled pulse density representation of a sine wave, chosen for ease of illustration. In an embodiment, a 2048 times oversampled pulse density representation of a sine wave is used.

A driver/interface sends electrical drive signals to ribbons in a MEMS array. Whenever the drive pattern value is "1", ribbon pairs in the array are set to equal deflection as shown at 820. Whenever the drive pattern values is "0", ribbon pairs in the array are set to unequal deflection as shown at 825. In any particular pair of ribbons, one ribbon may be at rest all the time, while the other is set to one of two possible deflections: the same as the other ribbon's rest state, or an activated state deflection. Because the ribbon drive pattern is digital, ribbons are never set to intermediate deflections.

Ribbon pairs having the same deflection, as in 820, lead to bright stripes in a 1-D pattern, while ribbon pairs having unequal deflection, as in 825, lead to dark stripes in a 1-D pattern. The brightness at a particular pixel of the pattern versus time is shown at 830. The actual light output intensity (digital light output 830) versus time is a digital function; in fact it is the same pulse density modulation representation as ribbon drive pattern 815. Digital ribbon operation eliminates having to accommodate a pixel transfer function expressing light output versus ribbon drive signal in. The high reconfiguration speed of MEMS ribbons allows them to follow the digital modulation signal faithfully.

When the digital light output at a pixel is viewed with a camera 835 having an integration time substantially longer than the digital period (i.e. the shortest time that the digital pattern remains at "1" or "0"), the time variation of the pattern appears sinusoidal, as shown at 840. This is an example of Σ–Δ modulation where the camera integration time is a low pass filter. Here "substantially" longer means more than five times longer. In an embodiment, 2048 reconfigurations of a projected light pattern take place in the same time as four camera exposure cycles; thus the projector rate is more than 500 times faster than the camera cycle rate. In general, the projector rate is faster than 100 times the camera cycle rate.

When ribbons in a MEMS array are arranged in pairs, ribbons having the same deflection may produce maximum light output, while ribbons having different deflections may produce minimum light output from a projection system. However, alternate phase discriminator designs are possible that reverse this behavior; i.e. ribbons having the same deflection produce minimum light output, while ribbons having different deflections produce maximum light output. With both of these approaches, the number of pixels (which may be spread into strips via anamorphic optics) is half of the number of ribbons.

Ribbons may also be operated such that transitions between ribbons determine pixel output. In this case, the number of pixels is equal to the number of ribbons. An optical phase discriminator may be designed for this case as discussed in the '448 patent.

Digital light output 830 and temporal intensity variation 840 describe actual and perceived light intensity versus time at one pixel in a projected 2-D pattern. The pattern also has sinusoidal variation in one spatial dimension.

Sinusoidal spatial variation is produced by delaying digital signals such as 815 to each successive active ribbon in an array. For example, pattern 815 may be sent to the first active ribbon in the array. A short time, Δt, later the same pattern is sent to the second active ribbon. A short time, Δt, later the same pattern is sent to the third active ribbon, etc. Here, Δt is shorter than the time for once cycle of pattern 815.

Figure 9A:
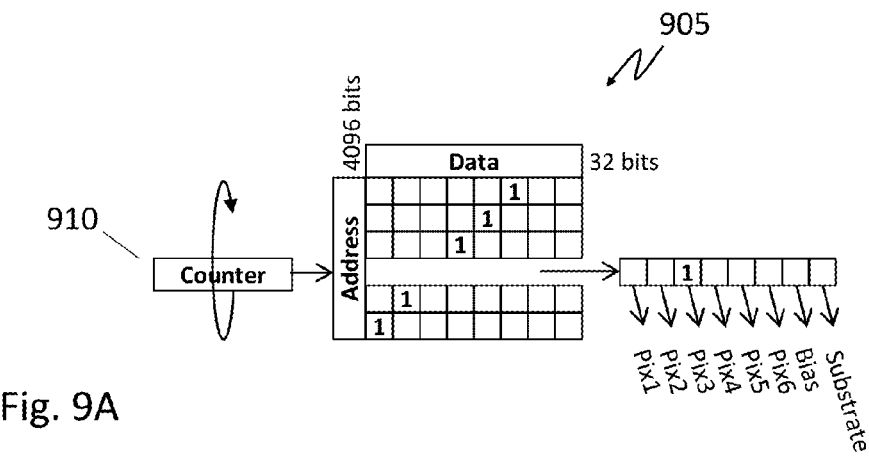
FIGS. 9A and 9B illustrate memory addressing strategies for generating digital ribbon data signals.
Figure 9B:
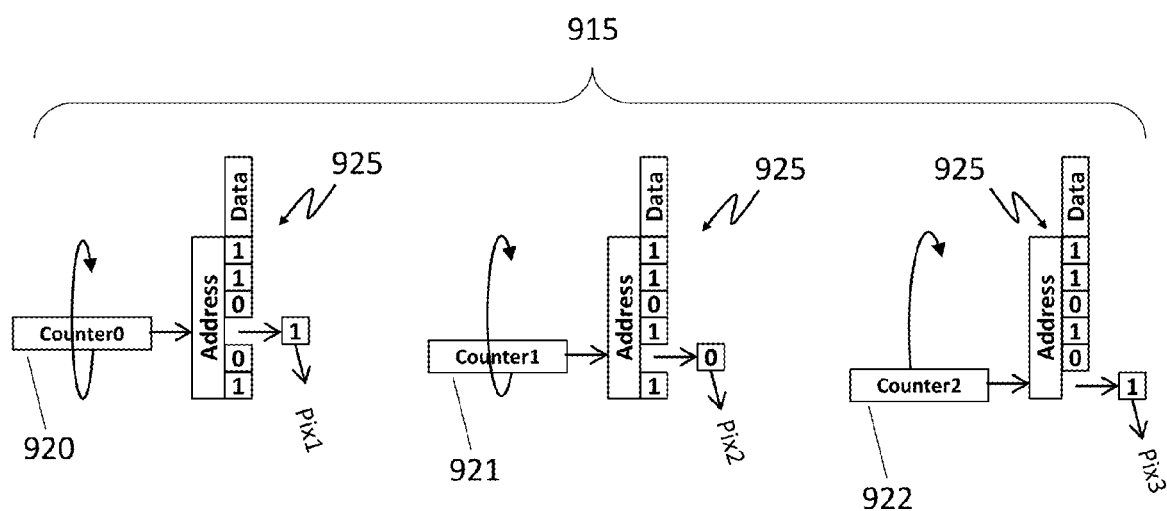

Small values for Δt lead to low-spatial-frequency projected patterns which provide coarse depth resolution and larger distance between depth ambiguities. Larger values for Δt, on the other hand, lead to high-spatial-frequency projected patterns which provide fine depth resolution, but smaller distance between depth ambiguities. Digital patterns such as 815 may be generated on-the-fly or retrieved from memory. In the latter case, time offsets Δt may be generated through memory addressing schemes. FIGS. 9A and 9B illustrate memory addressing strategies for generating digital ribbon data signals.

FIG. 9A shows an example 905 in which a digital pattern (analogous to pattern 815 in FIG. 8) is read from memory and supplied to 32 ribbon drive lines simultaneously. The pattern is 4096 bits long. Counter 910 selects 32-bit drive signals from a 32 bit by 4096 bit memory space. After the 4096th 32-bit signal is read, counter 910 returns to the first 32-bit signal. The 4096 bit pattern is the same for each active ribbon, but is offset for successive ribbons. The placement of 1's in the example is intended to indicate that successive active ribbons are driven by copies of the 4096 bit pattern offset by one bit per clock cycle. The strategy of FIG. 9A uses one memory address counter to access 32-bit wide data. To change the spatial frequency of light patterns produced from a MEMS-ribbon-based projector driven by data using the strategy of FIG. 9A, the data in the 32-bit by 4096-bit memory space must be updated to change the offsets between active ribbons. FIG. 9A shows data for pixels (e.g. "Pix3") and for "Bias" and "Substrate" signals. These additional signals are described below.

For some depth capture applications, it is desirable to be able to change the spatial frequency of projected patterns rapidly. This allows quick switching between high-precision depth data acquisition (with short ambiguity distance) and low-precision depth data acquisition (with long ambiguity distance).

FIG. 9B shows an example 915 in which a digital pattern (analogous to pattern 815 in FIG. 8) is read from memory using separate counters. Only three counters are shown for ease of illustration, one for each ribbon drive line. If 32 ribbon drive lines are to be addressed as in FIG. 9A, then 32 counters are needed. In this example, each counter addresses one, 1 bit by 4096 bit memory space 925. At any particular time, the counters retrieve data from different bits in the 4096 bit sequence. Changing spatial frequency is now just a matter of setting the counters to read data a different number of bits apart.

A projected pattern usually has several periods of sinusoidal spatial intensity variation rather than just one. That being the case, it is not necessary to produce as many ribbon drive signals as there are ribbons. Suppose for example that a ribbon array has N active ribbons and that it is used to project a pattern having K spatial periods. Only N/K different ribbon drive signals are necessary to produce the pattern. This leads to a simplification in wiring that may be understood with reference to FIG. 10 which illustrates a MEMS ribbon wiring diagram.

Figure 10:
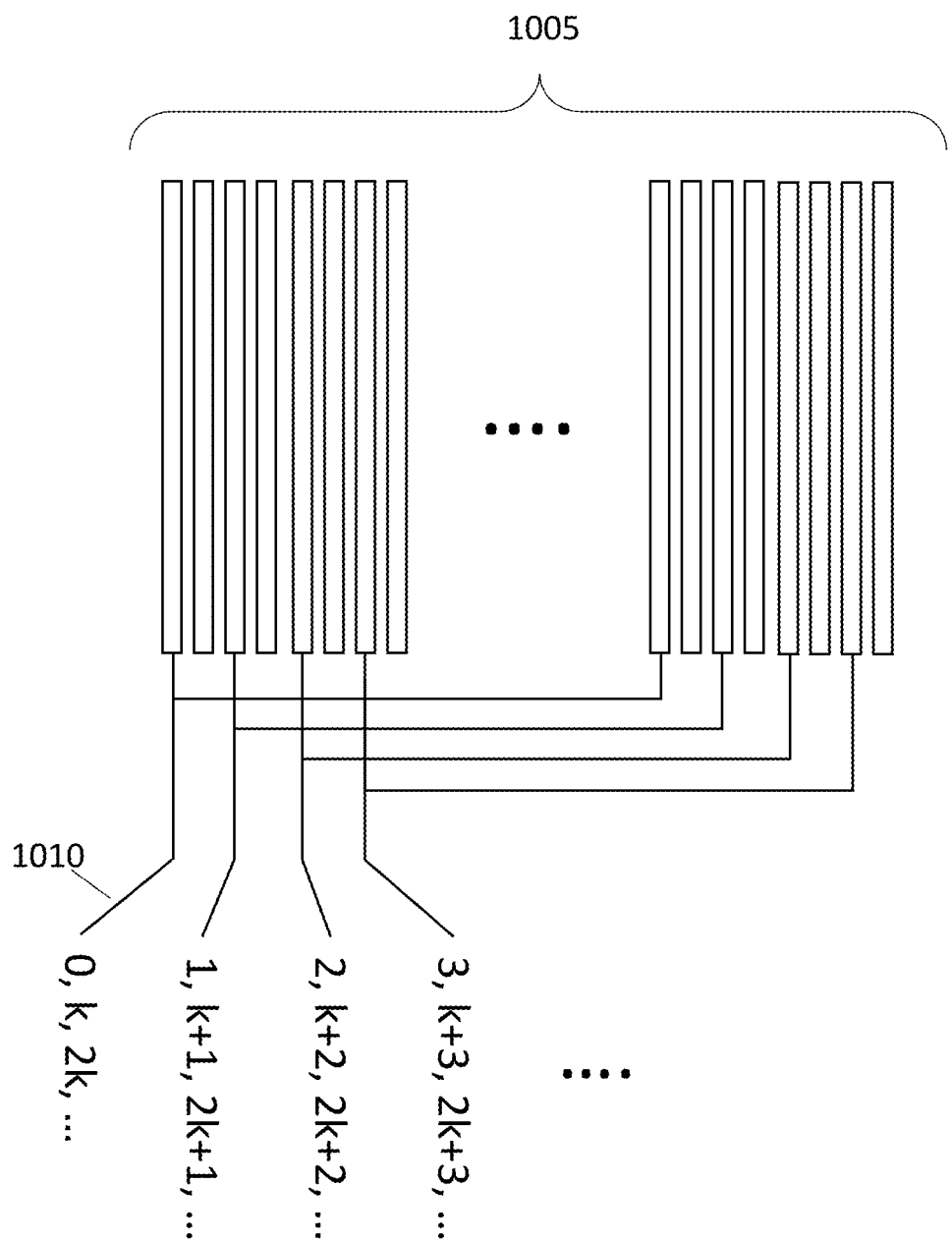
FIG. 10 illustrates a MEMS ribbon wiring diagram.

In FIG. 10, ribbons 1005 are part of a linear-array MEMS-ribbon light modulator. A signal line 1010 carries a digital drive signal to the zeroth, kth, 2kth, etc., active ribbon in the array. Similarly, another signal line carries another digital drive signal to the first, (k+1)th, (2k+1)th, etc., active ribbon. Another signal line carries yet another digital drive signal to the second, (k+2)th, (2k+2)th, etc., active ribbon. While there may be N active ribbons in the array, only N/K signal lines are required to drive it. This leads to a considerable simplification in MEMS signal line layout. The lowest spatial frequency pattern that can be produced using this scheme has N/K periods rather than the one-period pattern that could be achieved if each active ribbon were addressed separately. In an embodiment, a MEMS ribbon array has 128 active ribbons with every 32nd ribbon addressed together (i.e. N=128, K=32 in the notation used above). Thus the minimum number of spatial periods in a projected pattern is four.

In an embodiment, ribbon drive electronics use low-voltage ribbon drive techniques described in co-pending U.S. application Ser. No. 13/657,530 filed on Oct. 22, 2012 by Bloom et al., the disclosure of which is incorporated by reference. As described in the '530 application, low-voltage ribbon drive schemes used here are based on a DC bias voltage and a low-voltage ribbon control signal added in series to take advantage of ribbon nonlinear displacement characteristics. Low-voltage ribbon drive techniques make the ribbon driver electronics compatible with CMOS digital electronics commonly found in mobile devices. The bias voltage is represented by the bias signal mentioned in connection with FIG. 9.

In an embodiment, ribbon drive electronics also use pseudo-bipolar ribbon drive techniques described in U.S. Pat. No. 8,368,984 issued to Yeh and Bloom on Feb. 5, 2013, the disclosure of which is incorporated by reference. As described in the '984 patent, pseudo-bipolar ribbon drive schemes used here are designed to avoid difficulties that might otherwise arise when unipolar CMOS electronics are used to drive MEMS ribbon devices. In particular, pseudo-bipolar operation reduces or eliminates surface charge accumulation effects in MEMS ribbon devices. The substrate voltage is represented by the substrate signal mentioned in connection with FIG. 9.

Figure 11:
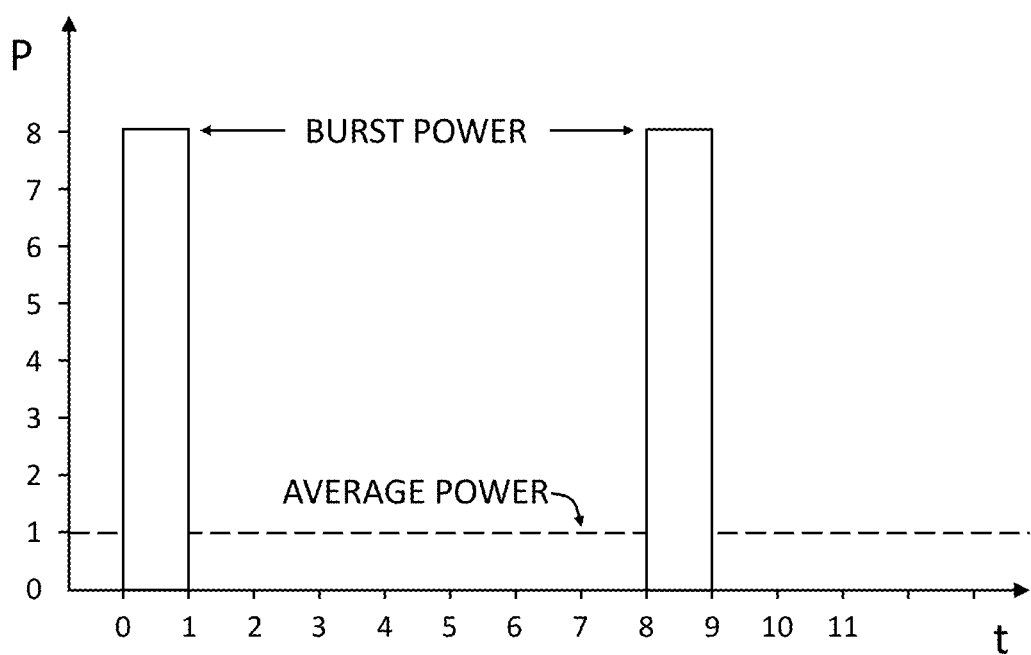
FIG. 11 is a graph illustrating power consumption during system burst mode operation.

A compact 3D depth capture system may operate continuously or in bursts. FIG. 11 is a graph illustrating power consumption during system burst mode operation. The graph plots depth capture system power, P, versus time. Most of the system power is consumed by the laser light source, although operating a camera at faster cycle rates also increases power consumption. In the example of FIG. 11, in one mode of operation, the laser, projector system and camera operate continuously and consume one unit of power. In a second mode of operation, "burst mode", the system operates at low duty cycle; it is on for only one unit of time out of eight. During that one unit "on" time, however, the system (primarily the laser) consumes eight units of power. The average power consumed is the same in both cases.

In the example of FIG. 11, the camera collects the same number of photons emitted by the projector system in burst mode or average mode. However, in burst mode, the number of background photons collected by the camera is reduced by a factor of eight because its shutter is open only ⅛ of the time. The signal to noise ratio is therefore improved by a factor of approximately $\sqrt{8}$. Furthermore, burst mode reduces motion artifacts if the camera runs at a faster cycle rate. Of course, the 1:8 or 12.5% duty cycle of FIG. 11 is only an example. A compact 3D depth capture system may be operated with duty cycles ranging from 100% to less than 1%, for example.

Figure 12:
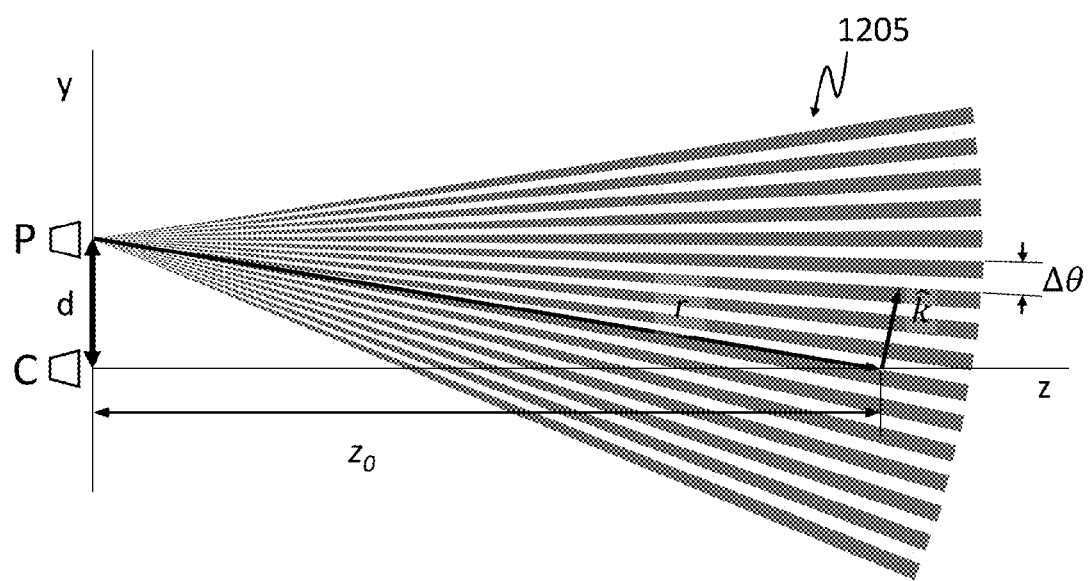
FIG. 12 is a diagram illustrating the relationship between spatial pattern phase and depth.

A compact 3D depth capture system projects a two-dimensional pattern having sinusoidal spatial variation in one dimension. The pattern also has sinusoidal variation in time. FIG. 12 is a diagram illustrating the relationship between spatial pattern phase and depth. In FIG. 12, item "P" is a 3D depth capture system pattern projector while item "C" is a camera. The camera is separated from the projector by a baseline distance, d. Projector P emits a light pattern that is represented in the figure by a radiating fan of stripes 1205. The stripe pattern in the figure has an "on/off" or square wave shape for ease of illustration; an actual pattern has sinusoidal spatial variation. AO is the angular extent of one period of the pattern. It may be estimated, for example, by dividing the angular field of view of the camera by the number of pattern periods visible to the camera.

Consider a distance $z_0$ along the z-axis as shown in the figure. The distance to this point from the projector is r. The spatial frequency of the pattern at the point is described by a (reciprocal space) k vector pointing in the k direction as shown in the figure. The magnitude of the k vector is given by $$|k| = \frac{2\pi}{r\Delta\theta}.$$

The z component of the k vector, $k_z$, is given by:

$$k_z = |k| \cdot \sin\left(\tan^{-1}\left(\frac{d}{z_0}\right)\right) \cong |k| \cdot \frac{d}{z_0}$$

The approximation is valid for $d \ll z_0$.

Suppose that the minimum detectable change in spatial phase that the camera can detect is $\Delta\phi_{min}$. This change in phase corresponds to a change in distance according to:

$$\Delta z = \frac{\Delta\phi_{min}}{k_z} = \frac{\Delta\phi_{min}}{|k|} \cdot \frac{z_0}{d}$$

Given the relationship between pattern spatial phase and distance, one can see that a 3D depth capture system can estimate distance to an object (appearing at a pixel in an image captured by its camera) by estimating the spatial phase of the pattern at the object. The intensity, I, of the pattern has the form:

$$\frac{I}{I_0} = \frac{1}{2} + \frac{1}{2}\cos(\omega t - k_z z) = \frac{1}{2} + \frac{1}{2}\cos(\omega t - \phi)$$

Figure 13:
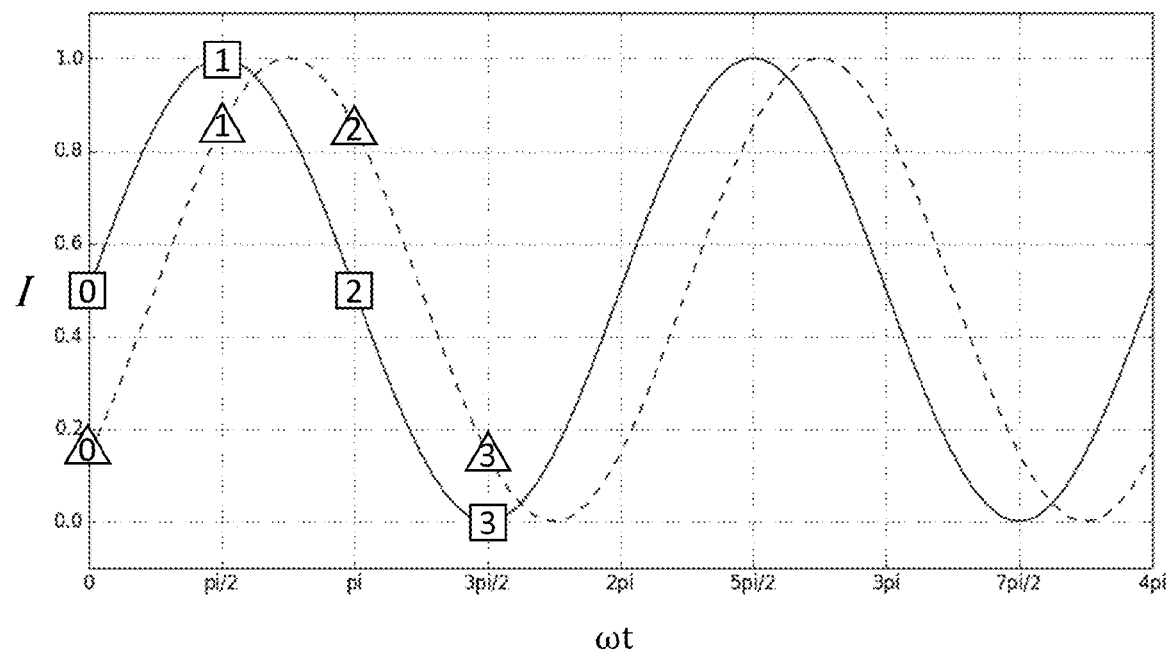
FIG. 13 is a graph illustrating phase measurements at two pixels in a camera.

Here $I_0$ is the maximum pattern intensity, w is the angular frequency of the pattern temporal modulation, t is time, and is the spatial phase. FIG. 13 is a graph illustrating phase measurements at two pixels in a camera. The pixels are identified by square and triangle subscripts. Pattern intensity at the first pixel (square subscript) is shown by the solid curve while pattern intensity at the second pixel (triangle subscript) is shown by the dashed curve.

Measurements of the pattern intensity curves for each pixel are obtained from a 3D depth capture system camera such as cameras 115, 215, 315, 420, 515, 835 or camera "C" in FIG. 12. In an embodiment, a rolling shutter CMOS camera is used to obtain pattern spatial phase measurements. Data from the rolling shutter camera is read out row-by-row continuously. Data from the first row is read out immediately following data from the last row of the camera image sensor. A camera cycle time is the time required to read out all the rows. The camera generates a timing signal that is synchronized to its rolling shutter cycles. This timing signal may be used as a trigger for projector pattern cycles. The camera has an inherent integration time associated with collecting photons at each pixel. All columns in a given row of image sensor pixels collect light simultaneously during the integration time. The integration time effectively imposes a low-pass filter on the high-speed digital light modulation signal that is projected by the MEMS ribbon-array projector. Thus the pulse density modulated light signal appears to have sinusoidal time variation when measured by the camera.

The phase $\phi$ of the pattern appearing on an object, and the corresponding depth of the object, is estimated on a per pixel basis; each measurement is independent of measurements made at other pixels. The phase is estimated by synchronous detection (i.e. sampling at regular intervals) of the pattern modulation signal. In-phase and quadrature measurements, referenced to the camera timing signal provide data necessary to estimate pattern signal phase.

In the example of FIG. 13, measurements are performed at $\omega t = 0, \pi/2, \pi, 3\pi/2, 2\pi$, etc., or four times per sine wave period. An in-phase measurement of the pattern intensity at the first pixel (square subscript) is obtained by subtracting the measurement made at $\omega t = \pi$ from the one made at $\omega t = 0$. A quadrature measurement of the pattern is obtained by subtracting the measurement made at $\omega t = 3\pi/2$ from the one made at $\omega t = \pi/2$. The phase is then the arctangent of the ratio of in-phase and quadrature measurements. The same procedure yields the phase at a second pixel (triangle subscript). Similar calculations are performed for in-phase and quadrature measurements made at each pixel.

Figure 14:
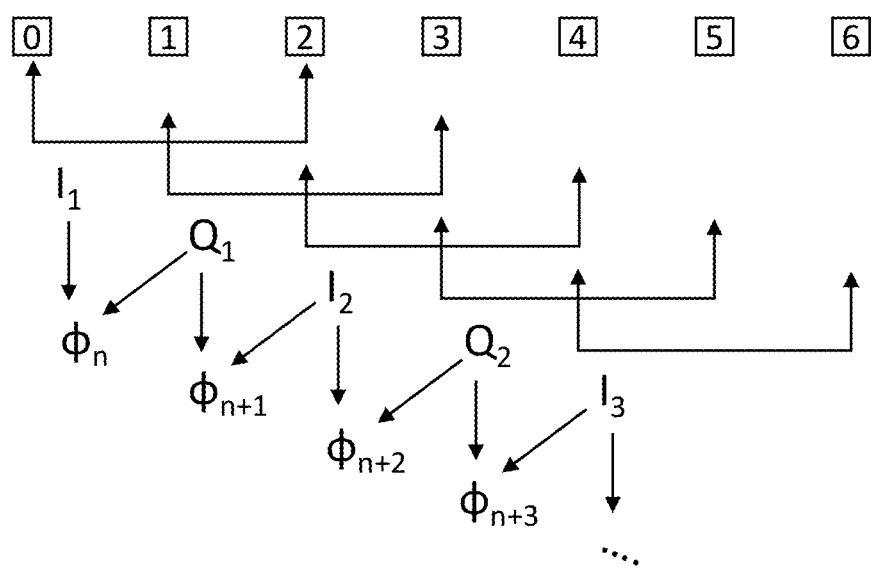
FIG. 14 illustrates depth data update cycles.

Although four measurements are needed to obtain the phase, phase estimates may be updated whenever a new measurement is available as shown in FIG. 14 which illustrates depth data update cycles. In FIG. 14, "1", "2", "3", etc. in squares represent intensity measurements made every time wt advances by $\pi/2$ as shown in FIG. 13. A phase estimate $\phi_n$ based on in-phase ($I_1$) and quadrature ($Q_1$) values is available after four measurements (0-3). When the fifth ("4") measurement becomes available a new in-phase ($I_2$) value is computed. Phase $\phi_{n+1}$ may then be estimated as the arctangent of $I_2/Q_1$. Each new measurement leads to a new in-phase or quadrature value that replaces the previous one.

Phase information may also be estimated from more than one cycle of data. The most recent 8 or 12 data points may be used for example. A finite impulse response filter may be applied to weight more recent measurements more heavily than older ones.

Figure 15:
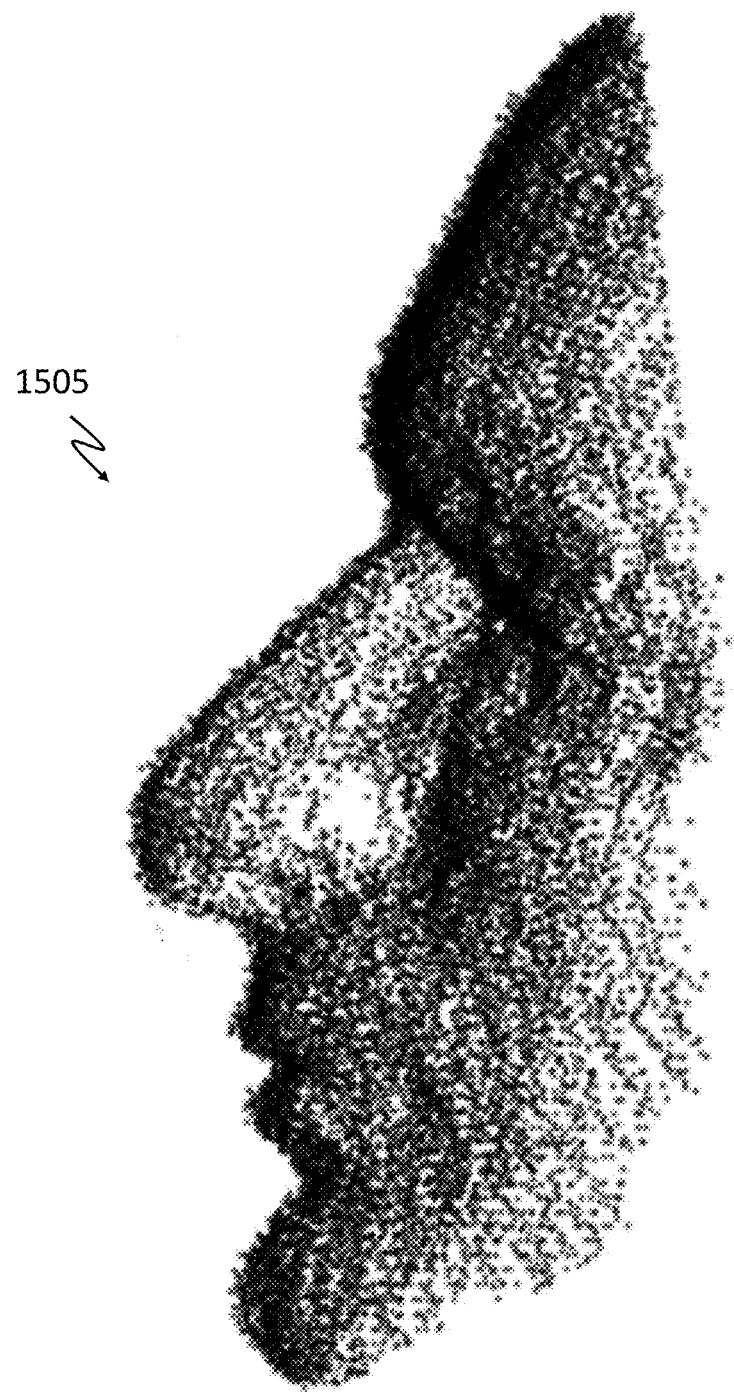
FIG. 15 shows an example of compact 3D depth capture system output data.

FIG. 15 shows an example of compact 3D depth capture system output data 1505. The actual data are 3D points (x, y, z). A 3D impression or rendering is created in the plane image of FIG. 15 via simulated lighting and shading effects. To recap, a set of data points such as the face shown in FIG. 15 is obtained as follows: A 3D system projector projects a pattern of infrared light onto the object. The pattern has sinusoidal variation in time and in one spatial dimension. A camera samples the pattern to obtain its phase at each pixel across an image. Depth information is computed from the phase according to geometric relationships that depend, in part, on the separation of the camera from the projector.

The projector is contained in a very small volume, compatible with integration into mobile devices such as smart phones and tables. In an embodiment, a projector fit inside a 3 mm×6 mm×10 mm volume. The camera may be similar to cameras already integrated in mobile devices. In an embodiment, the camera is a rolling shutter CMOS camera sensitive in the infrared.

Several variations of the compact 3D depth capture system described so far are possible. 3D system pattern projectors or cameras, or both, may be changed in some embodiments.

Different kinds of linear-array MEMS-ribbon light modulators may be used in the pattern projector. Light modulators described in the '448 patent or in U.S. Pat. No. 7,286,277 issued to Bloom on Oct. 23, 2007 (the disclosure of which is incorporated by reference) are examples of such alternatives. In addition, MEMS 2D array modulators, such as the Texas Instruments Digital Mirror Device, may be operated to produce patterns having one dimensional spatial variation as described above.

As an alternative to MEMS light modulators, a linear array of light emitters, such as vertical-cavity surface-emitting lasers (VCSELs) may be used to produce patterns with one dimensional spatial variation. A ferroelectric liquid crystal array modulating a continuous light source is another possibility. Further, the light source may be a light emitting diode rather than a laser.

A global shutter camera may be used instead of a rolling shutter camera, recognizing that some potential data acquisition time is wasted during camera reset. The projector light source may be turned off during global shutter reset times.

With either a rolling shutter or global shutter camera, phase estimates may be obtained using three, rather than four measurements per pattern temporal period. When three pattern intensity measurements, $I_1$, $I_2$, $I_3$ are made, spaced apart by $\omega t=2\pi/3$, phase is estimated according to:

$$\phi = \tan^{-1}\left[\frac{\sqrt{3}\,(I_1 - I_3)}{2I_2 - I_1 - I_3}\right]$$

Projector and camera cycles may be triggered from a common timing signal or a signal derived from either the projector or camera clock frequency.

The above description of the disclosed embodiments is provided to enable any person skilled in the art to make or use the invention. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A three-dimensional depth capture system comprising:
a pattern projector;
a camera having an integration time; and,
a mobile device driver/interface;
the projector, camera and driver/interface integrated into a mobile electronic device,
the projector comprising a digital, linear-array MEMS ribbon light modulator and a lens system that projects two-dimensional images having spatial variation in only one dimension, and,
the MEMS ribbon light modulator being driven by digital electronic signals from the driver/interface, the digital electronic signals (a) having a digital modulation period less than the camera integration time and (b) expressing a pulse density modulation representation of a sine wave characterized by a temporal period, such that digital temporal intensity modulation of light by the MEMS ribbon light modulator appears as sinusoidal temporal intensity modulation when viewed by the camera.

2. The system of claim 1, the camera sampling the images three times per temporal period of the sine wave.

3. The system of claim 2, the mobile device driver/interface providing depth data based on the three most recent camera samples to an application processor in the mobile electronic device.

4. The system of claim 1, the camera sampling the images four times per temporal period of the sine wave.

5. The system of claim 4, the mobile device driver/interface providing depth data based on the four most recent camera samples to an application processor in the mobile electronic device.

6. The system of claim 1, the pulse density modulation representation oversampling the sine wave by at least 64 times.

7. The system of claim 1, the digital signals being stored in a circular memory buffer.

8. The system of claim 7, the images having a spatial frequency that is selected by relative offsets into the memory buffer.

9. The system of claim 7, signals for adjacent active ribbons in the array obtained from offset memory addresses in the memory buffer.

10. The system of claim 1, the camera having an integration time such that the images appear to have sinusoidal temporal intensity variation when viewed by the camera.

11. The system of claim 1, the digital signals being compatible with CMOS logic levels.

12. The system of claim 1, the digital electronic signals obeying a pseudo bipolar MEMS drive scheme.

13. The system of claim 1, the digital electronic signals comprising a DC bias voltage and a low-voltage ribbon control signal added in series to take advantage of ribbon nonlinear displacement characteristics.

14. The system of claim 1, the linear-array MEMS ribbon light modulator having N active ribbons and K addressing lines, N being an integer multiple of K.

15. The system of claim 14, the images characterized by N/K cycles of a spatial period.

16. The system of claim 1, the camera being a rolling shutter CMOS camera.

17. The system of claim 1, the camera being a global shutter camera.

18. The system of claim 1, the projector comprising a diode-laser infrared light source.

19. The system of claim 1, the projector comprising an infrared light emitting diode.

20. The system of claim 1, the projector and camera sharing a common timing signal.

21. The system of claim 1, the projector and camera having an operating duty cycle less than 100%.

22. The system of claim 1, the projector fitting into a volume 3 mm by 6 mm by 10 mm or smaller.

23. The system of claim 1, the mobile device driver/interface providing depth data to an application processor in the mobile electronic device.

24. The system of claim 1, the mobile device driver/interface providing depth data, based on a finite impulse response filter function of recent camera samples, to an application processor in the mobile electronic device.

25. The system of claim 1, the mobile electronic device being a cell phone.

26. The system of claim 1, the mobile electronic device being a tablet computer.

\* \* \* \* \*